United States Patent
Miyoshi et al.

(10) Patent No.: US 8,100,807 B2
(45) Date of Patent: Jan. 24, 2012

(54) REDUCTION GEAR TRANSMISSION AND SOLAR TRACKING PHOTOVOLTAIC POWER GENERATION UNIT UTILIZING THE SAME

(75) Inventors: Hiroyuki Miyoshi, Tsu (JP); Hongyou Wang, Tsu (JP); Shigeki Asano, Tsu (JP)

(73) Assignee: Nabtesco Corporation, Tokyo (JP)

( * ) Notice: Subject to any disclaimer, the term of this patent is extended or adjusted under 35 U.S.C. 154(b) by 408 days.

(21) Appl. No.: 12/449,176

(22) PCT Filed: Feb. 8, 2008

(86) PCT No.: PCT/JP2008/052157
§ 371 (c)(1),
(2), (4) Date: Jul. 27, 2009

(87) PCT Pub. No.: WO2008/096857
PCT Pub. Date: Aug. 14, 2008

(65) Prior Publication Data
US 2010/0004086 A1    Jan. 7, 2010

(30) Foreign Application Priority Data

Feb. 9, 2007 (JP) ................................. 2007-030532

(51) Int. Cl.
*F16H 1/32* (2006.01)
*H02N 6/00* (2006.01)
(52) U.S. Cl. ........................ 475/178; 136/246
(58) Field of Classification Search .................. 475/162, 475/178
See application file for complete search history.

(56) References Cited

U.S. PATENT DOCUMENTS

| 4,574,659 A | 3/1986 | Arndt |
| 4,898,065 A | 2/1990 | Ogata et al. |
| 2011/0132433 A1* | 6/2011 | Tanaka et al. ................. 136/246 |

FOREIGN PATENT DOCUMENTS

JP    A-61-76848    4/1986

(Continued)

OTHER PUBLICATIONS

Aug. 9, 2010 Search Report issued in European Patent Application No. 08711036.7.

*Primary Examiner* — Dirk Wright
(74) *Attorney, Agent, or Firm* — Oliff & Berridge, PLC

(57) ABSTRACT

A first reduction gear unit has a first input shaft that rotates in accordance with the rotation of an output shaft of a motor, a first external gear that revolves orbitally around an axis line of the first input shaft, and a first internal gear that has a number of teeth differing from the number of teeth of the first external gear. A second reduction gear unit comprises a crankshaft that rotates in accordance with the rotation of a first output shaft, a second external gear having a through hole formed at a center itself, a cylindrical member passing through the through hole of the second external gear, a second internal gear that has a number of teeth differing from the number of teeth of the second external gear, and a second output shaft that rotates around an axis line of the second internal gear. The first reduction gear unit is disposed between an outer circumferential surface of the second reduction gear unit and an inner surface of the cylindrical member.

9 Claims, 7 Drawing Sheets

| | FOREIGN PATENT DOCUMENTS | | | JP | A-2001-193801 | 7/2001 |
|---|---|---|---|---|---|---|
| JP | U-3-60640 | 6/1991 | | JP | A-2005-142373 | 6/2005 |
| JP | A-5-180277 | 7/1993 | | WO | WO 2006/077825 A1 | 7/2006 |
| JP | A-2000-258722 | 9/2000 | | | | |
| JP | A-2001-187945 | 7/2001 | | * cited by examiner | | |

US 8,100,807 B2

REDUCTION GEAR TRANSMISSION AND SOLAR TRACKING PHOTOVOLTAIC POWER GENERATION UNIT UTILIZING THE SAME

TECHNICAL FIELD

The present application claims priority to Japanese Patent Application No. 2007-030532 filed on Feb. 9, 2007, the contents of which are hereby incorporated by reference into the present specification.

The present invention relates to a reduction gear transmission. In particular, the present invention relates to a reduction gear transmission that comprises a plurality of reduction gear units, and is capable of outputting a large torque required, for example, in rotating a solar panel or the like in order to track the sun.

BACKGROUND ART

A reduction gear transmission that reduces the rotation speed of an output shaft of a motor and outputs the reduced rotation speed is known to the art. In order to realize a large reduction ratio in this reduction gear transmission, a plurality of gears is combined. However, when too many gears are combined, the reduction gear transmission increases in size, and the configuration of the reduction gear transmission becomes more complex. A large reduction ratio may be realized by unitizing the reduction gear transmissions and connecting the unitized reduction gear transmissions in series.

Japanese Patent Application Publication No. 2001-193801 sets forth a reduction gear transmission having a first reduction gear unit (a first stage gear device) and a second reduction gear unit (a second stage gear device). The first reduction gear unit is an inner meshing planetary gear reduction device. The inner meshing planetary gear reduction device comprises an eccentric body shaft, an external gear, and an internal gear. The eccentric body shaft rotates coaxially with an output shaft of a motor (a motor shaft) and comprises an eccentric cam. The external gear engages with the eccentric cam. The internal gear allows the external gear to rotate eccentrically while maintaining a meshed state with the external gear. Further, the internal gear surrounds the external gear. The internal gear has a number of teeth differing from the number of teeth of the external gear. The external gear rotates with respect to the internal gear while rotating eccentrically around an axis line of the internal gear. In the present specification, the phenomenon of the external gear rotating eccentrically around the axis line of the internal gear is also termed revolving orbitally around the axis line of the internal gear. Further, the case where "the external gear rotates", refers to the external gear rotating relative to the internal gear. An output shaft (a slow speed shaft) is coupled with the external gear. Torque of the first reduction gear unit is transmitted to the second reduction gear unit via the output shaft. The second reduction gear unit reduces the speed of an inputted rotation via two shafts that are disposed parallel to one another. That is, in the second reduction gear unit, an output shaft having a through hole formed in its center is connected to an input shaft that rotates integrally with the output shaft of the first reduction gear unit by a helical pinion and a helical gear, and the number of rotation of the output shaft of the second reduction gear unit is reduced to less than the number of rotations of the input shaft of the second reduction gear unit. In the technique of Japanese Patent Application Publication No. 2001-193801, a large reduction ratio is realized by connecting the first reduction gear unit and the second reduction gear unit in series. A large torque can be obtained by realizing the large reduction ratio.

DISCLOSURE OF INVENTION

Problem to be Solved by the Invention

For example, in rotating a solar panel to track the sun, an extremely large torque is required compared to cases such as rotating the joints of a robot or the like. That is, an extremely large reduction ratio is required.

In the case where the large torque is realized by using the technique of the aforesaid Japanese Patent Application Publication No. 2001-193801, the diameter of the helical gear attached to the output shaft of the second reduction gear unit must be increased. Alternatively, the number of teeth of the helical gear must be increased. In either case, the diameter of the second reduction gear unit increases.

If two inner meshing planetary gear reduction devices utilizing the first reduction gear unit of aforesaid Japanese Patent Application Publication No. 2001-193801 are prepared, and are connected in series, a large torque can be realized without increasing the diameter of the second reduction gear unit. However, in this method, a hole that passes through a central part of the reduction gear transmission cannot be maintained, and piping, wiring, etc. can no longer be passed through the reduction gear transmission.

The present teachings aim to solve the above problem. That is, a reduction gear transmission is set forth in the present teachings which, when realizing a large torque by combining a plurality of reduction units, does not increase the diameter of the second reduction gear unit and is capable of maintaining the through hole in the central part.

Means to Solve the Problem

A reduction gear transmission of the present teachings comprises a first reduction gear unit and a second reduction gear unit. The first reduction gear unit has a first input shaft that rotates in accordance with the rotation of an output shaft of a motor, a first external gear that revolves orbitally around an axis line of the first input shaft in accordance with the rotation of the first input shaft, a first internal gear meshing with the first external gear, and a first output shaft that rotates around an axis line of the first internal gear. The first internal gear has a number of teeth differing from the number of teeth of the first external gear. The second reduction gear unit has a crankshaft that rotates in accordance with the rotation of the first output shaft, an eccentric cam that revolves orbitally around an axis line of the crankshaft in accordance with the rotation of the crankshaft, a second external gear engaging with the eccentric cam and having a through hole at a center of itself, a cylindrical member passing through the through hole of the second external gear, a second internal gear meshing with the second external gear, and a second output shaft that rotates around an axis line of the second internal gear. The second internal gear has a number of teeth differing from the number of teeth of the second external gear. Furthermore, the first reduction gear unit is positioned between an extensional plane that continues from an outer circumferential surface of the second reduction gear unit and an extensional plane that continues from an inner circumferential surface of the cylindrical member that passes through the through hole of the second external gear.

According to the above reduction gear transmission, from a plan view along the axis line of the reduction gear transmission, the first reduction gear unit is not positioned at the interior of the cylindrical member of the second reduction gear unit. From the plan view along the axis line, the first reduction gear unit is positioned between the outer circumferential surface of the second reduction gear unit and the inner circumferential surface of the cylindrical member. In this reduction gear transmission, piping, wiring, or the like can be passed through the interior of the cylindrical member without interfering with the first reduction gear unit. It is thereby possible to prevent wiring, etc. from becoming entangled during the operation of the reduction gear transmission. Further, the first reduction gear unit is not positioned outwards from the outer circumferential surface of the second reduction gear unit. It is possible to position the outer circumferential surface of the first reduction gear unit inwards from the outer circumferential surface of the second reduction gear unit. That is, an outer circumferential surface of the reduction gear transmission can be made to have the same shape as the outer circumferential surface of the second reduction gear unit. A casing for housing the first reduction gear unit and the second reduction gear unit can consequently be simplified.

The above reduction gear transmission uses the second reduction gear unit that reduces speed by utilizing the external gear that is caused to revolve orbitally by the crankshaft and the internal gear that has a number of teeth differing from the number of teeth of the external gear. A large torque can be obtained using the second reduction gear unit that has a small diameter.

In the reduction gear transmission of the present teachings, it may be preferred that the first reduction gear unit has a first crankshaft that rotates in accordance with the rotation of the first input shaft, and a first eccentric cam that revolves orbitally around an axis line of the first crankshaft in accordance with the rotation of the first crankshaft, and that the first external gear engages with the first eccentric cam.

According to the above reduction gear transmission, since the first eccentric cam revolves orbitally around the axis line of the first crankshaft, the first external gear revolves orbitally around the axis line of the first internal gear while meshing with the first internal gear. This type of reduction unit can realize a large torque despite its compact size by adjusting the number of teeth of the first external gear and the number of teeth of the first internal gear. Since both the first reduction gear unit and the second reduction gear unit are capable of realizing a large torque, the torque of the reduction gear transmission can become extremely large.

In the reduction gear transmission of the present teachings, it may be preferred that the axis line of the first crankshaft is offset from the axis line of the first input shaft, and that the first crankshaft revolves orbitally around the axis line of the first input shaft in accordance with the rotation of the first input shaft.

According to the above reduction gear transmission, a space can be formed between the first input shaft and the first crankshaft. Since the gears can be disposed in this space, the torque of the first reduction gear unit can be further increased.

In the reduction gear transmission of the present teachings, it may be preferred that an intermediate shaft is provided that rotates around the axis line of the second internal gear in accordance with the rotation of the first output shaft, and the crankshaft of the second reduction gear unit rotates in accordance with the rotation of the intermediate shaft.

According to the above reduction gear transmission, the axis line of the first output shaft can be offset from the axis line of the intermediate shaft of the second reduction gear unit. It is possible to use various sized motors or first reduction gear units by changing the distance between the axis line of the first output shaft and the axis line of the intermediate shaft of the second reduction gear unit. Furthermore, the reduction ratio of the reduction gear transmission can be adjusted easily by adjusting the reduction ratio between the first output shaft and the intermediate shaft, or between the intermediate shaft and the crankshaft of the second reduction gear unit.

Further, since providing the intermediate shaft makes it no longer necessary to directly connect the first output shaft and the crankshaft of the second reduction gear unit, the position in which the first output shaft and the crankshaft of the second reduction gear unit are placed can be designated freely.

In the reduction gear transmission of the present description, a plurality of types of reduction unit can be adopted as the second reduction gear unit. As a specific version thereof, a type of reduction unit may be adopted which the crankshaft of the second reduction gear unit revolves orbitally around the axis line of the second internal gear in accordance with the rotation of the intermediate shaft.

According to the above reduction gear transmission, the intermediate shaft and the crankshaft of the second reduction gear unit can be disposed in a position offset from one another. That is, it is also possible to reduce speed between the intermediate shaft and the second reduction gear unit. The torque of the reduction gear transmission can thereby be further increased.

As another specific version of the second reduction gear unit, a type of reduction unit may be adopted which the crankshaft of the second reduction gear unit rotates around the axis line of the second internal gear in accordance with the rotation of the first output shaft, and a through hole is formed in the crankshaft of the second reduction gear unit.

According to the above reduction gear transmission, the intermediate shaft and the crankshaft of the second reduction gear unit can be integrated. That is, only one crankshaft of the second reduction gear unit needs to be positioned at a central part of the second reduction gear unit. The members that constitute the reduction gear transmission can thereby be reduced. In the reduction gear transmission of the present description, it may be preferred that the first output shaft rotates in accordance with the rotation of the first external gear, and the second output shaft rotates in accordance with the rotation of the second external gear. According to the above reduction gear transmission, since the first output shaft rotates in accordance with the rotation of the first external gear, the rotation of the first internal gear can be restrained. That is, the casing of the first reduction gear unit can be integrated with the first internal gear. Further, since the second output shaft rotates in accordance with the rotation of the second external gear, the rotation of the second external gear can be restrained. The casing of the second reduction gear unit can be integrated with the second internal gear. Further, since the first internal gear and the second internal gear do not rotate relative to one another, the casings of the first reduction gear unit and the second reduction gear unit can be integrated. A reduction gear transmission with a simpler configuration can thereby be realized.

The reduction gear transmission of the present teachings can be utilized for different purposes. For example, the reduction gear transmission of the present teachings may be utilized as a reduction gear transmission for rotating a panel of a photovoltaic power generation unit to track the sun. Since the panel of the photovoltaic power generation unit must be moved to track the movement of the sun, it is preferred that the panel has an extremely slow rotation speed. Further, since the panel of the photovoltaic power generation unit is extremely heavy, a large torque is required to rotate the panel. Since the reduction gear transmission of the present description is capable of realizing a large torque and a large reduction ratio, it is suitable for rotating the panel of the photovoltaic power generation unit. Further, in the photovoltaic power generation unit, there may be a necessity to connect piping, wiring, or the like with the panel. Since such piping, wiring, or the like can easily be passed through the interior of the through hole in the reduction gear transmission of the present teachings, the appearance of the photovoltaic power generation unit can be simplified, and the wiring, etc. can be protected from exposure to external environments such as rain. Moreover, the term "tracking the sun" in the present specification refers to the panel maintaining a position perpendicular to the moving sun. Alternatively, the term "tracking the sun" may refer to adjusting the angle of the panel so that light reflected by the panel is continuously focused at a fixed point.

Effects of the Invention

According to the reduction gear transmission of the present teachings, the configuration can be simplified of a reduction gear transmission that has a through hole and has a plurality of reduction units joined in series. By having the plurality of reduction units joined in series, the reduction gear transmission of the present teachings is capable of realizing an extremely large torque. Further, an extremely large reduction ratio can also be obtained.

EMBODIMENTS OF THE INVENTION

Figure 1:
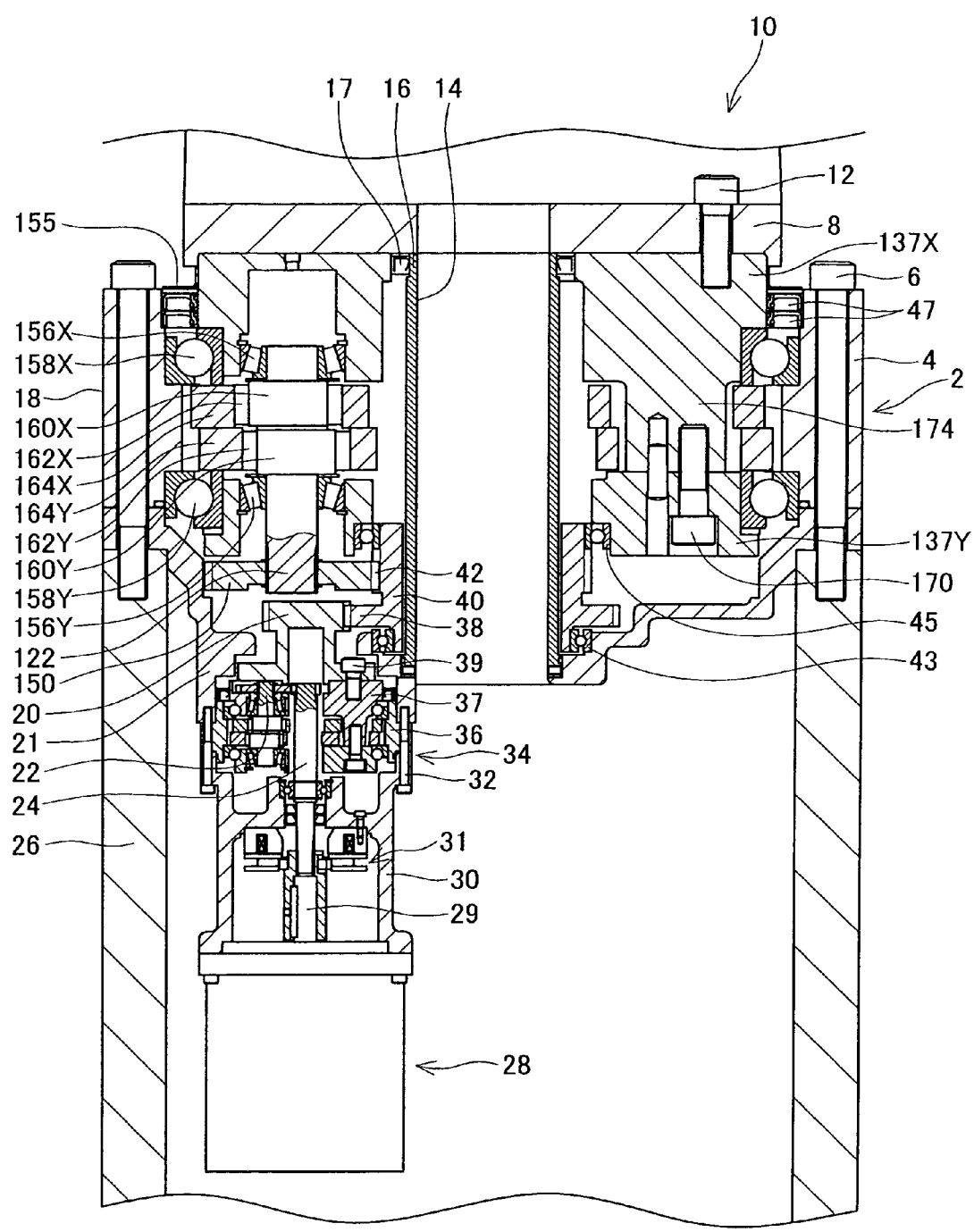
FIG. 1 shows a cross-sectional view of a reduction gear transmission of a first embodiment.

Some of the features of the present embodiments will be described below.

(First Feature) An oil seal 47 is disposed in a double layer between a carrier 137X and an internal gear 4.

(Second Feature) An internal gear 36 of a first reduction gear unit 34 is fixed to a support member 21. The internal gear 4 of a second reduction gear unit 2 is fixed to a fixing part 26. The support member 21 is fixed to the fixing part 26. The internal gear 36 and the internal gear 4 maintain a relationship in which they do not rotate relative to one another.

Embodiments will be described below with reference to the figures.

First Embodiment

Figure 2:
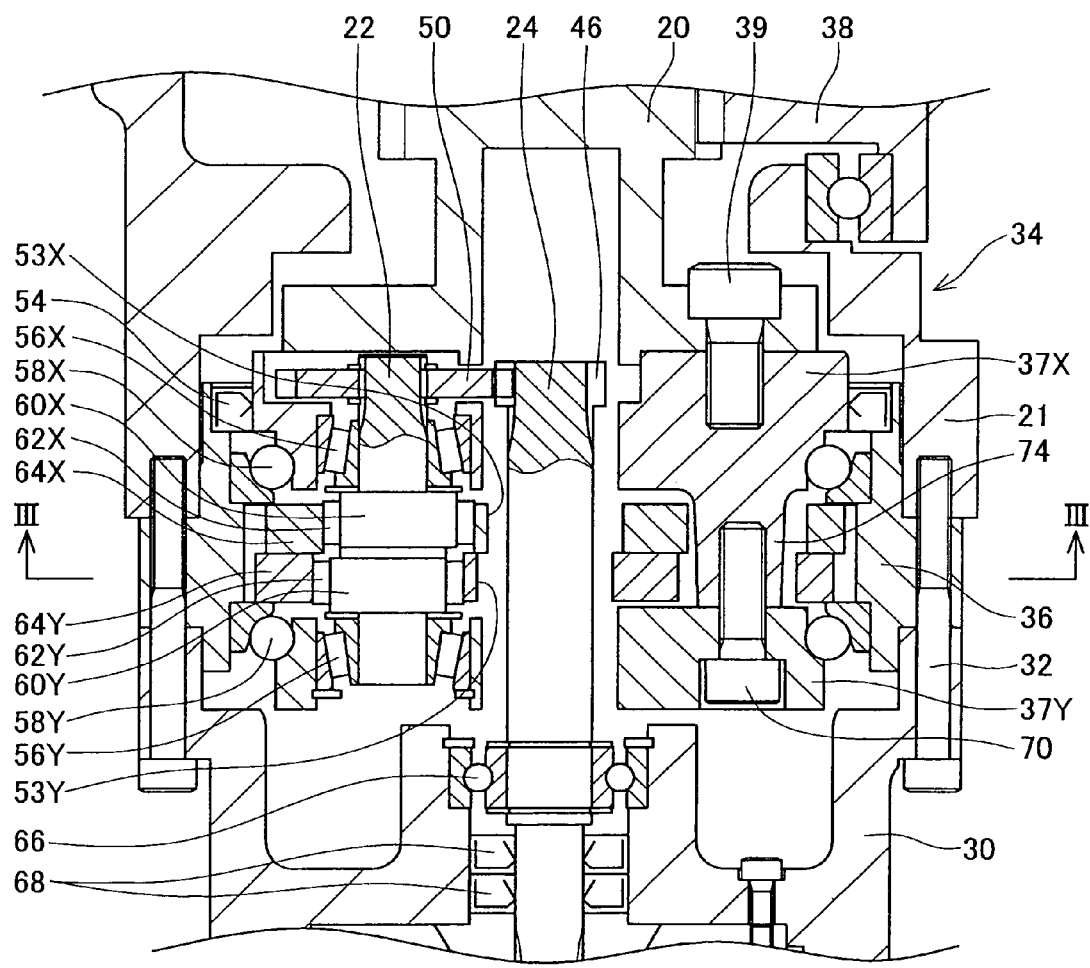
FIG. 2 shows an expanded view of a first reduction gear unit in the reduction gear transmission of FIG. 1.
Figure 3:
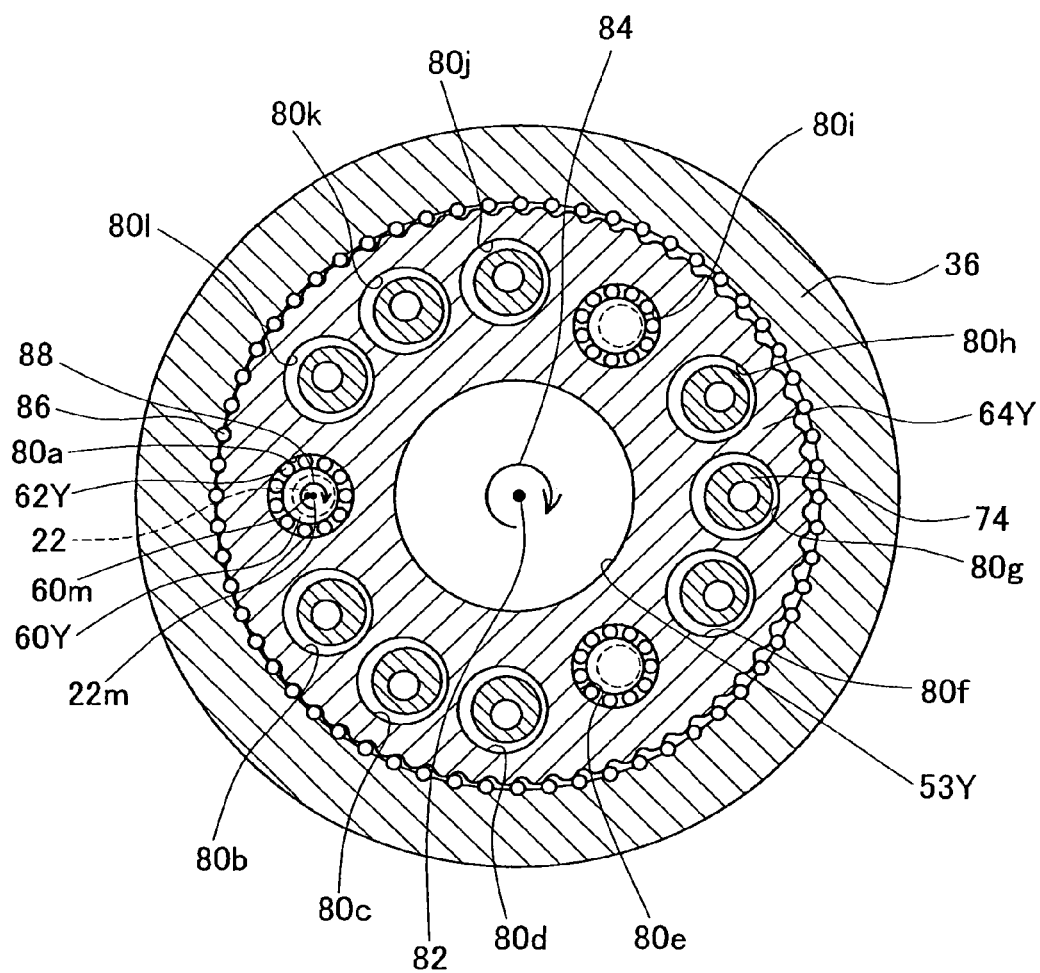
FIG. 3 shows a cross-sectional view along the line III-III of FIG. 2.

FIG. 1 shows a cross-sectional view of a reduction gear device 10 of the present embodiment. FIG. 2 shows an expanded view of a first reduction gear unit 34 of FIG. 1. FIG. 3 shows a cross-sectional view along the line III-III of FIG. 2. Moreover, in FIG. 3, a first input shaft 24 (to be described later in detail) has been omitted.

As shown in FIG. I, the reduction gear transmission 10 has the first reduction gear unit 34 and a second reduction gear unit 2. The configuration of the first reduction gear unit 34 and the second reduction gear unit 2 will be described later. First, the connectional relationship between the first reduction gear unit 34 and the second reduction gear unit 2 will be described. A first input shaft 24 of the first reduction gear unit 34 is connected to an output shaft 29 (also termed a "motor output shaft") of a motor 28. The first input shaft 24 rotates in accordance with the rotation of the motor output shaft 29. When the first input shaft 24 rotates, a carrier 37 of the first reduction gear unit 34 rotates with respect to a first internal gear member 36 around an axis line of the first internal gear member 36. Although this will be described later, the first internal gear member 36 is hollow, and an internal gear is formed at an inner side thereof. In the following description, the first internal gear member 36 may also be termed a "first internal gear 36". A first output shaft 20 is connected to the carrier 37 by a bolt 39. That is, the first output shaft 20 rotates with respect to the first internal gear 36 around the axis line of the first internal gear 36.

The second reduction gear unit 2 has a crankshaft 122. An input gear 150 is fixed to the crankshaft 122. Further, the second reduction gear unit 2 comprises a hollow intermediate shaft 40 that rotates around an axis line of a second internal gear member 4. An upper side gear part 42 and a lower side gear part 38 are formed in the intermediate shaft 40. The lower side gear part 38 meshes with the first output shaft 20, and the upper side gear part 42 meshes with the input gear 150. That is, the crankshaft 122 is capable of rotating in accordance with the rotation of the first output shaft 20. When the crankshaft 122 rotates, a carrier (an upper side carrier 137X and a lower side carrier 137Y) of the second reduction gear unit 2 rotates around the axis line of the second internal gear member 4. A pivoting body 8 is fixed to the carrier 137X by a bolt 12. Although this will be described later, the second internal gear member 4 is hollow, and an internal gear is formed at its inner side. In the description below, the second internal gear member 4 may also be termed the "second internal gear 4". Further, the upper side carrier 137X and the lower side carrier 137Y may together be termed the "carrier 137".

A cylindrical member 16 is disposed in a central part of the second reduction gear unit 2. A through hole 14 (also termed an "inner circumferential surface 14 of the cylindrical member 16") is formed in the cylindrical member 16. The cylindrical member 16 passes through a through hole respectively formed in the centers of external gears 164X and 164Y of the second reduction gear unit 2, and passes through a through hole formed in the intermediate shaft 40. The first reduction gear unit 34 is positioned between an extensional plane which extendedly continues from an outer circumferential surface 18 of the second reduction gear unit 2 and an extensional plane which extendedly continues from the inner circumferential surface 14 of the cylindrical member 16.

The first reduction gear unit 34 will be described in detail with reference to FIGS. 2 and 3. Below, in explaining the phenomena occurring in common for a plurality of components of the same type that is present, the letters added to the numbers of these components may be omitted.

As shown in FIG. 2, a gear part 46 is formed at an end part of the first input shaft 24. The first input shaft 24 is connected to the motor output shaft 29 (see FIG. 1). An input gear 50 is fixed to a crankshaft (a first crankshaft) 22. Since the input gear 50 meshes with the gear part 46, the crankshaft 22 rotates in accordance with the rotation of the first input shaft 24. An axis line of the first crankshaft 22 is offset from an axis line of the first input shaft 24. Eccentric cams 60X and 60Y are formed on an outer circumferential surface of the first crankshaft 22. The eccentric cam 60 revolves orbitally (rotates eccentrically) around the axis line of the first crankshaft 22. The numbers 64X and 64Y refer to external gears (first external gears). The external gear 64 has a trochoid tooth shape. The numbers 62X and 62Y refer to needle roller bearings. The relationship between the external gear 64, the needle roller bearings 62 and the eccentric cam 60 will be described later with reference to FIG. 3.

As shown in FIG. 3, a central through hole 53Y is formed at the center of the external gear 64Y, and twelve through holes 80a to 80l are formed in a circumferential direction of the external gear 64Y. The eccentric cam 60Y fits with the through holes 80a, 80e, and 80i via the plurality of needle roller bearings 62Y. Column-shaped parts 74 pass through the through holes 80b to 80d, 80f to 80h, and 80j to 80l respectively. The column-shaped parts 74 each extend from the upper side carrier 37X (see FIG. 2).

The shape of the outer diameter of the eccentric cam 60Y is circular, and its center 60m is offset from an axis line 22m of the first crankshaft 22. When the first crankshaft 22 rotates, the center 60m of the eccentric cam 60Y revolves orbitally around the axis line 22m as shown by the arrow 88. When the eccentric cam 60Y revolves orbitally, the external gear 64Y revolves orbitally around an axis line 82 of the internal gear 36 as shown by the arrow 84. That is, the external gear 64Y engages with the eccentric cam 60Y and revolves orbitally (i.e. rotates eccentrically). Moreover, the eccentric cam 60Y also fits with the through holes 80e and 80i likewise. The operation and effects of the eccentric cam 60Y fitting with the through holes 80e and 80i are the same as those of the eccentric cam 60Y fitting with the through hole 80a.

As shown in FIG. 3, the external gear 64Y is surrounded by the internal gear member 36. A plurality of internal gear pins 86 is disposed on an inner circumferential surface of the internal gear member 36, forming an internal gear. The external gear 64Y meshes with the internal gear (the internal gear pins 86). In other words, the external gear 64Y engages with the internal gear member 36 via the internal gear pins 86. The number of outer teeth of the external gear 64Y differs from the number of teeth of the internal gear 36 (the number of internal gear pins 86). When the external gear 64Y revolves orbitally in the direction of the arrow 84 around the axis line 82 of the internal gear 36, the external gear 64Y rotates with respect to the internal gear 36 around the axis line 82 in accordance with the difference in number of teeth of the external gear 64Y and the internal gear 36. Moreover, the number of teeth of the external gear 64Y and the number of teeth of the internal gear 36 (the number of internal gear pins 86) shown in FIG. 3 do not accurately show the actual number of the teeth. The actual number of teeth can be changed in accordance with the required torque (or reduction ratio). Further, the above description is also applicable to the external gear 64X. Difference is noted in the application thereto that the direction in which the external gear 64X is eccentric from the axis line 82 is opposite with respect to the direction of the external gear 64Y is eccentric from the axis line 82. In other words, the external gear 64Y and the external gear 64X are always positioned symmetrically with respect to the axis line 82, and consequently a relationship is realized in which rotational balance is stable.

As shown in FIG. 2, a support member 30 of the motor 28, the internal gear 36, and a support member 21 of the first reduction gear unit 34 are fixed by a bolt 32 (see also FIG. 1). That is, in the first reduction gear unit 34, the rotation of the internal gear 36 is prevented with respect to the support member 30. As a result, the input gear 50 rotates when the first input shaft 24 is rotated by the motor 28. The rotation of the input gear 50 rotates the crankshaft 22, and the eccentric cams 60X and 60Y revolve orbitally around the axis line of the crankshaft 22. Due to the orbital revolution of the eccentric cams 60X and 60Y, the external gears 64X and 64Y, while respectively meshing with the internal gear 36, revolve orbitally around the axis line 82 of the internal gear 36 while rotating with respect to the internal gear 36. The carrier 37 rotates with respect to the internal gear 36 in accordance with the rotation of the external gears 64X and 64Y. The upper side carrier 37X and the lower side carrier 37Y are positioned such that the external gears 64X and 64Y are interposed between the upper side carrier 37X and the lower side carrier 37Y, and the upper side carrier 37X and the lower side carrier 37Y are fixed by a bolt 70. When the carrier 37 rotates with respect to the internal gear 36, the first output shaft 20 rotates with respect to the internal gear 36.

As shown in FIG. 2, a pair of angular ball bearings 58X and 58Y is disposed between the carrier 37 and the internal gear 36. The carrier 37 is supported so as to be capable of rotating with respect to the internal gear 36, and so as to be incapable of moving in an axial direction. A pair of tapered roller bearings 56X and 56Y is disposed between the carrier 37 and the crankshaft 22. The crankshaft 22 is supported so as to be capable of rotating with respect to the carrier 37, and so as to be incapable of moving in an axial direction. A deep groove ball bearing 66 is disposed between the support member 30 of the motor 28 and the first input shaft 24. The first input shaft 24 is supported so as to be capable of rotating with respect to the support member 30.

An oil seal 54 is disposed between the internal gear 36 and the upper side carrier 37X. Oil that has been injected into the first reduction gear unit 34 is prevented by the oil seal 54 from leaking toward the second reduction gear unit 2 (see also FIG. 1). An oil seal 68 is disposed between the support member 30 of the motor 28 and the first input shaft 24. Since the oil seal 68 is disposed in a double layer, the oil that has been injected into the first reduction gear unit 34 is prevented from leaking toward the motor 28.

The second reduction gear unit 2 will be described in detail with reference to FIG. 1. Moreover, the basic configuration of the second reduction gear unit 2 is the same as that of the first reduction gear unit 34. Components that are substantially the same as in the first reduction gear unit 34 have the same two lower digits applied thereto, and a description thereof may be omitted.

The second reduction gear unit 2 comprises the crankshaft 122, eccentric cams 160X and 160Y that revolve orbitally around an axis line of the crankshaft 122 in accordance with the rotation of the crankshaft 122, second external gears 164X and 164Y that have central through holes formed at their centers respectively, engage with the eccentric cams 160X and 160Y respectively, and have trochoid tooth shapes respectively, the cylindrical member 16 that passes through the through holes of the second external gears 164X and 164Y, and an internal gear 4 that surrounds the second external gears 164X and 164Y. The internal gear 4 allows the second external gears 164X and 164Y to revolve orbitally while meshing with the second external gears 164X and 164Y. The internal gear 4 and the second external gears 164X and 164Y have a differing number of teeth. The intermediate shaft 40 is disposed at an outer side of the cylindrical member 16. A space is formed between the cylindrical member 16 and the intermediate shaft 40, and the intermediate shaft 40 is capable of rotating around the cylindrical member 16. The intermediate shaft 40 rotates around the axis line of the internal gear 4 in accordance with the rotation of the first output shaft 20. Further, a deep groove ball bearing 45 is disposed between the intermediate shaft 40 and the carrier 137Y, and a deep groove ball bearing 43 is disposed between the intermediate shaft 40 and the support member 21 of the first reduction gear unit 34. The intermediate shaft 40 is supported so as to be capable of rotating with respect to the lower side carrier 137Y of the second reduction gear unit 2 and the support member 21 of the first reduction gear unit 34.

The input gear 150 is formed on the crankshaft 122. The input gear 150 meshes with the upper side gear part 42 of the intermediate shaft 40. When the intermediate shaft 40 rotates, the crankshaft 122 rotates. The eccentric cams 160X and 160Y are caused to revolve orbitally around the axis line of the crankshaft 122 by the rotation of the crankshaft 122. When the eccentric cams 160X and 160Y revolve orbitally, the external gears 164X and 164Y revolve orbitally around the axis line of the internal gear 4.

The internal gear 4 and the fixing part 26 are fixed by a bolt 6. That is, in the second reduction gear unit 2, the rotation of the internal gear 4 is prevented with respect to the fixing part 26, and when the crankshaft 122 rotates, the external gears 164X and 164Y rotate with respect to the internal gear 4 while revolving orbitally around the axis line of the internal gear 4. In accordance with the rotation of the external gears 164X and 164Y, the carriers 137X and 137Y rotate with respect to the internal gear 4 (in another words, with respect to the fixing part 26). In the present embodiment, the carrier 137 forms an output shaft (i.e. a second output shaft).

An oil seal 17 is disposed between the upper side carrier 137X and the cylindrical member 16. Oil that has been injected into the second reduction gear unit 2 is prevented from leaking to the exterior by the oil seal 17. An oil seal 47 is disposed between the upper side carrier 137X and the internal gear 4. As described above, the carrier 137 rotates with respect to the internal gear 4. A great deal of oil can easily leak between the carrier 137 and the internal gear 4, and foreign matter from the exterior can readily enter therein. However, in the reduction gear transmission 10, the oil seal 47 is disposed in a double layer, and consequently oil that has been injected into the second reduction gear unit 2 is prevented from leaking to the exterior, and foreign matter from the exterior is reliably prevented from entering the reduction unit 2. Furthermore, a ring shaped protective plate 155 is disposed at an outer side of the oil seal 47 and covers between the upper side carrier 137X and the cylindrical member 16. The ring shaped protective plate 155 prevents dust, etc. in the exterior environment from making contact with the oil seal 47.

In the reduction gear transmission 10, the internal gear 36 of the first reduction gear unit 34 is not rotated, and consequently the internal gear 36, the support member 21, and the support member 30 of the motor 28 are fixed integrally. That is, the internal gear 36, the support member 21, and the support member 30 can be utilized as a casing of the first reduction gear unit 34. Further, since the internal gear 4 of the second reduction gear unit 2 is not rotated, the internal gear 4, the support member 21, and the fixing part 26 can be fixed to one another. That is, the internal gear 4, the support member 21, and the fixing part 26 can be utilized as a casing of the second reduction gear unit 2. The internal gear 36 of the first reduction gear unit 34 and the internal gear 4 of the second reduction gear unit maintain a relationship in which they do not rotate relative to one another, and the casings of the first reduction gear unit 34 and the second reduction gear unit 2 are formed integrally.

In order to prevent the reduction gear transmission 10 from rotating while it is not operating, a negative actuation type (i.e. a normally closed type) braking device 31 is disposed between the first reduction gear unit 34 and the motor 28. The braking device 31 is a magnetically activated device, and is fixed within the support member 30. The braking device 31 has an exciting coil and a spring. When the exciting coil is not excited, the braking device 31 applies braking force by means of the force of the spring to a disc member fixed to the first input shaft 24 of the first reduction gear unit 34. That is, the first input shaft 24 is prevented from rotating. When the exciting coil is excited, this braking force is released. Disposing the braking device 31 at an input side of the reduction gear transmission 10 allows the braking device 31 to be made smaller than if it is disposed at an output side of the reduction gear transmission 10.

Moreover, although this will be described later, different types of reduction unit can be utilized as the first reduction gear unit 34 and the second reduction gear unit 2 respectively. What is important is not the type of the first reduction gear unit 34 and the second reduction gear unit 2, but instead, viewed from the axis line, that the first reduction gear unit 34 is disposed between the outer circumferential surface of the second reduction gear unit 2 and the inner surface of the through hole 14 of the cylindrical member 16.

Second Embodiment

Figure 4:
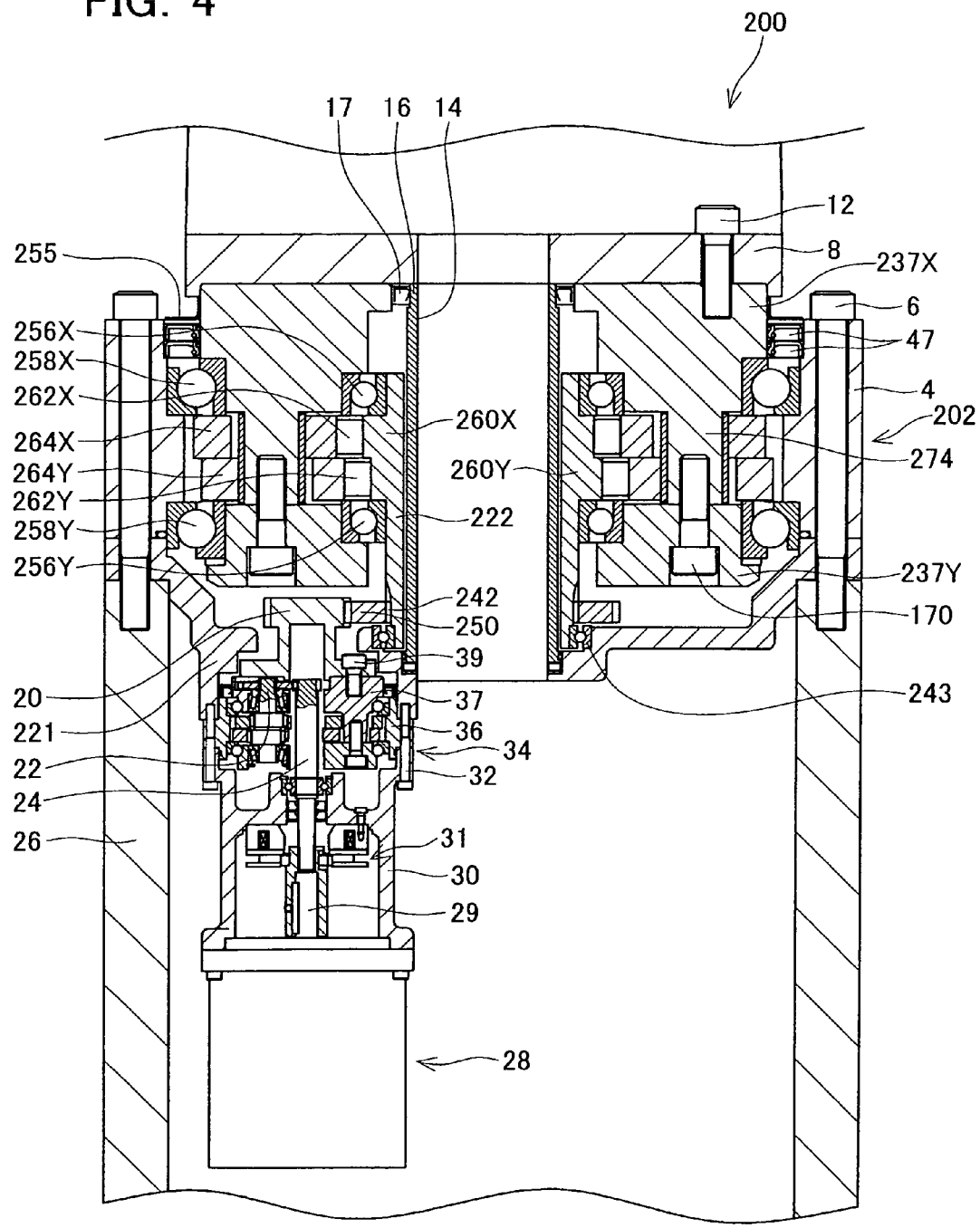
FIG. 4 shows a cross-sectional view of a reduction gear transmission of a second embodiment.

A reduction gear transmission 200 of the present embodiment will be described with reference to FIG. 4.

The reduction gear transmission 200 is a variant of the reduction gear transmission 10, and components that are substantially the same as those of the reduction gear transmission 10 have the same digits applied thereto or the same two lower digits applied thereto, and a description thereof may be omitted.

The reduction gear transmission 200 has the first reduction gear unit 34 and a second reduction gear unit 202. That is, in the reduction gear transmission 200, the configuration of the first reduction gear unit 34 is the same as in the reduction gear transmission 10. Here, only the second reduction gear unit 202 will be described.

In the second reduction gear unit 202, a crankshaft 222 rotates around the axis line of the second internal gear 4. Further, a through hole is formed along an axis line of the crankshaft 222, and the cylindrical member 16 passes through this through hole. Eccentric cams 260X and 260Y are formed on the crankshaft 222. An input gear part 242 is formed on the crankshaft 222. The input gear part 242 is a spline, and connects with a spline groove formed within a hollow intermediate shaft 250.

When the output shaft 20 of the first reduction gear unit 34 rotates, the crankshaft 222 rotates around the axis line of the internal gear 4. The eccentric cams 260X and 260Y are caused to revolve orbitally around the axis line of the crankshaft 222 by the rotation of the crankshaft 222. When the eccentric cams 260X and 260Y revolve orbitally, external gears 264X and 264Y revolve orbitally around the axis line of the internal gear 4. In the second reduction gear unit 202, when the crankshaft 222 rotates, the external gears 264X and 264Y rotate with respect to the internal gear 4 while revolving orbitally around an axis line of the internal gear 4.

As described above, different types of reduction unit can be utilized as the first reduction gear unit 34 and the second reduction gear unit 2. For example, the same type of reduction unit as the second reduction gear unit 202 can be utilized as the first reduction gear unit 34. That is, a type of reduction unit can be utilized in which the crankshaft of the first reduction gear unit 34 rotates around the axis line of the internal gear 36.

Further, in the first reduction gear unit 34, a type of reduction unit can also be utilized that does not have an eccentric cam. For example, a reduction unit that has a first spur gear (a first input shaft) that rotates in accordance with the rotation of the output shaft 29 of the motor 28, a second spur gear (a first external gear) that revolves orbitally around an axis line of the first spur gear while meshing with the first spur gear, and an internal gear (a first internal gear) that meshes with the second spur gear and has a number of teeth differing from the number of teeth of the second spur gear may be utilized. This type of reduction unit is termed a "planetary gear". In the case of this type of reduction gear transmission, the rotation of the motor 28 can be transmitted to a crankshaft of the second reduction gear unit 2 by providing an output shaft that rotates around an axis line of the internal gear in accordance with orbital revolution of the second spur gear.

Third Embodiment

Figure 5:
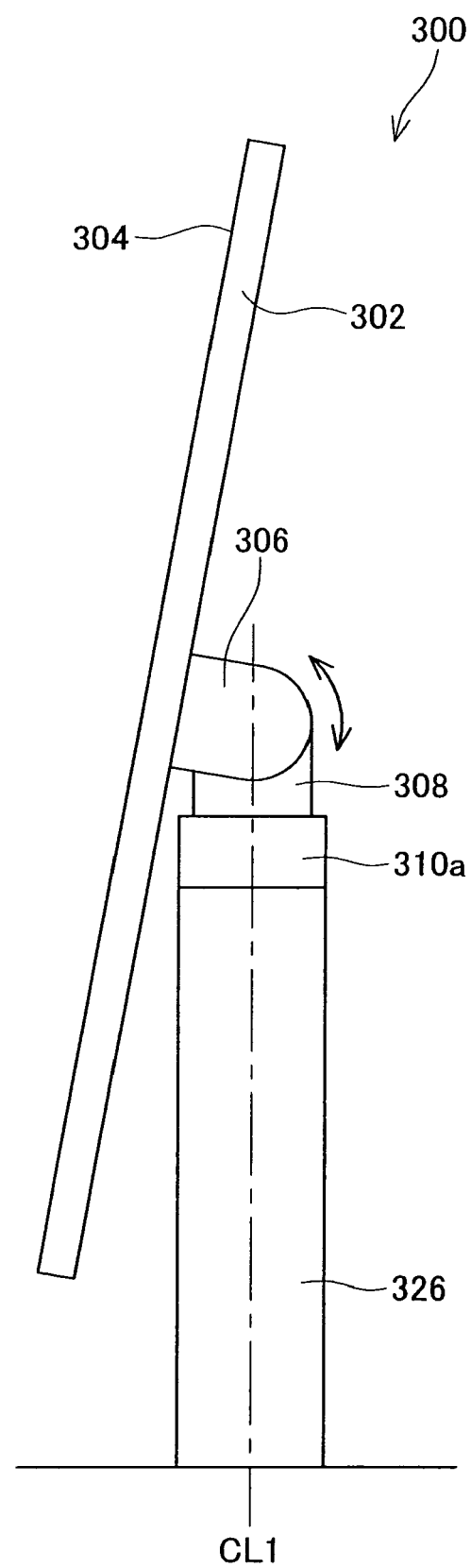
FIG. 5 shows a side view of a photovoltaic power generation unit.
Figure 6:
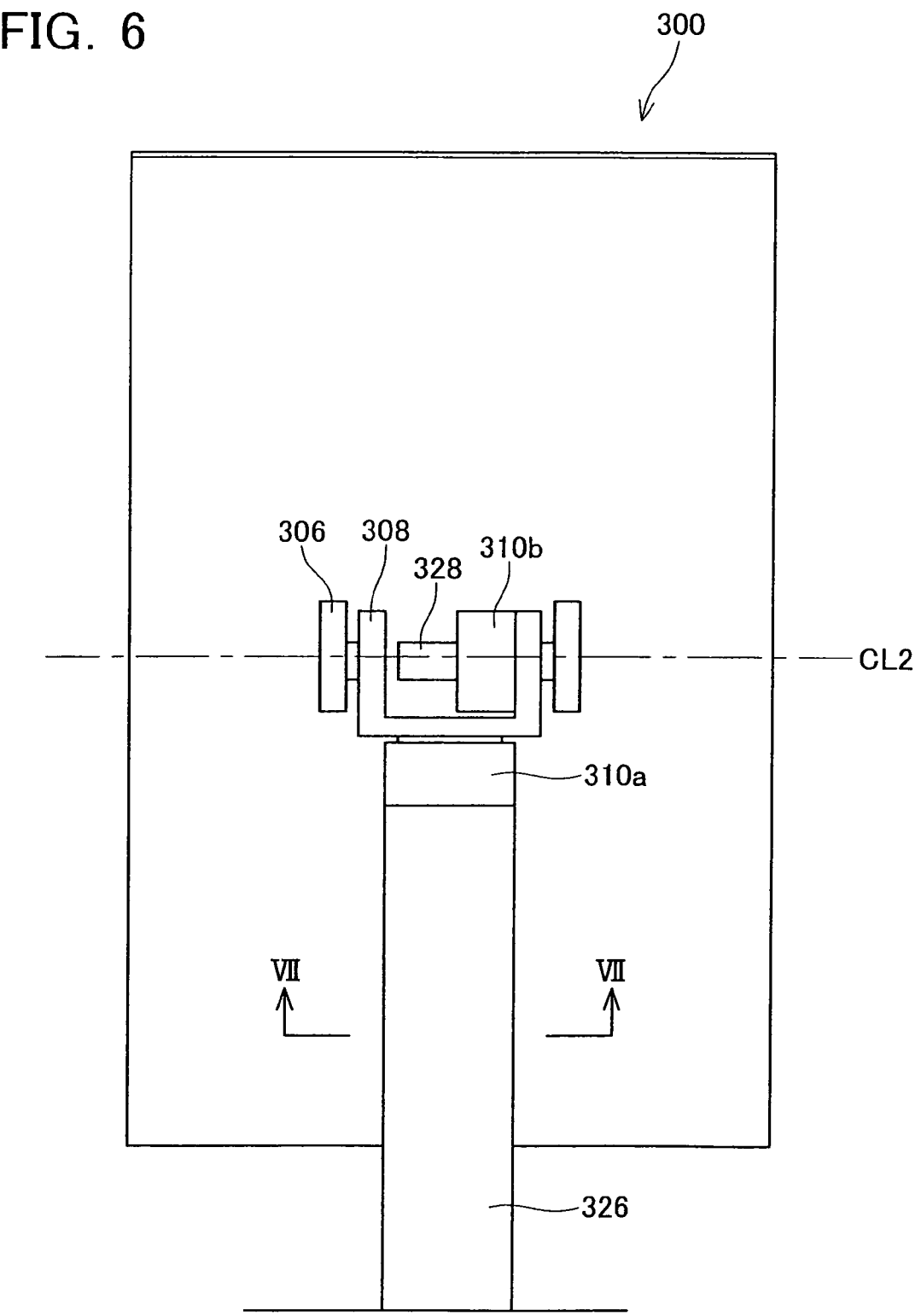
FIG. 6 shows a rear view of the photovoltaic power generation unit.
Figure 7:
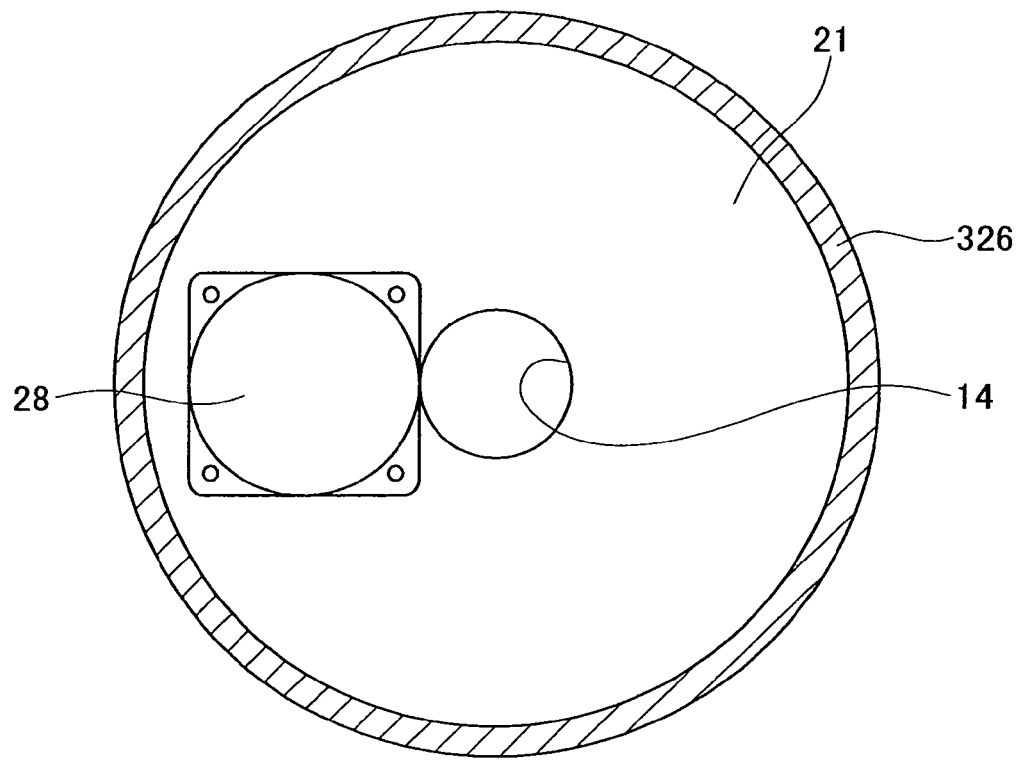
FIG. 7 shows a cross-sectional view along the line VII-VII of FIG. 6.

In the present embodiment, a solar tracking photovoltaic power generation unit 300 will be described that utilizes the reduction gear transmission 10. FIG. 5 shows a side view of the solar tracking photovoltaic power generation unit 300. FIG. 6 shows a rear view of the solar tracking photovoltaic power generation unit 300. FIG. 7 shows a cross-sectional view along the line VII-VII of FIG. 6.

As shown in FIG. 5 and FIG. 6, the solar tracking photovoltaic power generation unit 300 has, in general, a fixing part 326, a first rotation part 310a, a second rotation part 310b, and a solar panel 302. A plurality of solar cells 304 is disposed on a surface of the solar panel 302. A pivoting body 308 is fixed to the first rotation part 310a. A pivoting body 306 is fixed to the solar panel 302. The pivoting body 306 is supported by the pivoting body 308 so as to be capable of rotation. The solar panel 302 can be rotated around an axis line CL1 by rotation of the first rotation part 310a, and can be rotated around an axis line CL2 (the direction of the arrow in FIG. 5) by rotation of the second rotation part 310b. In the solar tracking photovoltaic power generation unit 300, the reduction gear transmission 10 is utilized in the first rotation part 310a and the second rotation part 310b.

The surface of the solar panel 302 is adjusted constantly so as to have a position orthogonal to the sun by rotating the first rotation part 310a and the second rotation part 310b. That is, it is necessary for the first rotation part 310a and the second rotation part 31 0b to rotate at an extremely slow speed. As described above, the reduction gear transmission 10 is capable of realizing a large torque. That is, the reduction gear transmission 10 is suitable for slowly rotating the solar panel 302 to track the movement of the sun. Further, the reduction gear transmission 10 is capable of rotating the solar panel 302 approximately 180 degrees around the axis line CL2. When the reduction gear transmission 10 is utilized, it is easy to move the solar panel 302 to track the movement of the sun when the position of the sun moves from the left side of the axis CL1, relative to the page in FIG. 5, to the right side of the axis CL, relative to the page.

FIG. 7 shows a cross-sectional view along the line VII-VII of FIG. 6. As shown in FIG. 7, the reduction gear transmission 10 is disposed within the fixing part 326. Moreover, the fixing part 326 is the same member as the fixing part 26 shown in FIGS. 1 and 4. The number 21 in the figure refers to the support member 21 of the reduction gear transmission 10 (see FIG. 1). The through hole 14 is formed in the central part of the reduction gear transmission 10. Further, a motor 328 is connected to the second rotation part 310b (see FIG. 6). Piping, wiring, or the like utilized in the motor 328 and to be connected to the solar panel 302 can be passed through the through hole 14. As described above, in the reduction gear transmission 10, the first reduction gear unit 34 is disposed between the extensional plane continuous from the outer circumferential surface 18 of the second reduction gear unit and the extensional plane continuous from the inner circumferential surface 14 of the cylindrical member 16. As a result, it is easy for the wiring, etc. to be passed through the through hole 14, and tangling of the wiring, etc. when the solar panel 302 rotates can be prevented. Further, the configuration from the fixing part 326 to the first rotation part 310a, and the positioning of the second rotation part 310b and the motor 328 is simplified.

Moreover, in the present embodiment, a solar tracking photovoltaic power generation unit 300 in which a plurality of solar cells 304 is formed on the surface of the solar panel 302 has been exemplified. However, the reduction gear transmission 10 can also be utilized in another type of solar tracking photovoltaic power generation unit. For example, the reduction gear transmission 10 can be utilized in a type of solar tracking photovoltaic power generation unit having a parabolic concave mirror or having a plurality of reflectors aligned to form one concave mirror and a substage (heat) condenser is positioned at a focal point thereof. Alternatively, the reduction gear transmission 10 can be utilized in a type of solar tracking photovoltaic power generation unit utilizing a plurality of reflectors, these each focusing the sun's light at a fixed point. In this case, a panel (board collector) provided with the concave mirror or the plurality of reflectors is adjusted so as to track the sun and to focus the sun's light at a fixed point.

In the solar tracking photovoltaic power generation unit of the present embodiment, the reduction gear transmission 10 is utilized in both the first rotation part 310a and the second rotation part 310b. However, the reduction gear transmission 10 may be utilized in either one of the first rotation part 310a or the second rotation part 310b, and another speed reduction method can be adopted in the other of either the first rotation part 310a or the second rotation part 310b. Further, the reduction gear transmission 200 can be utilized instead of the reduction gear transmission 10.

Specific embodiments of the present teachings are described above, but these merely illustrate some possibilities of the teachings and do not restrict the scope of the claims. The art set forth in the claims includes variations and modifications of the specific examples set forth above.

For example, in the first embodiment above, twelve through holes are formed in the circumferential direction of the external gears in the first reduction gear unit and the second reduction gear unit. Three eccentric cams fit into these through holes, and nine column-shaped parts pass therethrough. However, the number of through holes, eccentric cams, and column-shaped parts is not restricted to the number in this embodiment, and at least one or more eccentric cam may fit into the through holes. This is also applicable to the first reduction gear unit of the second embodiment.

In the above embodiments, the through hole is formed at the center of the external gear of the first reduction gear unit, and the first input shaft passes through this through hole. However, the through hole is not necessarily required in the first reduction gear unit. In the case where a through hole is not formed at the center of the external gear in the first reduction gear unit, an input gear fixed to the crankshaft may be located at a position closer toward the motor than a position where the external gear is located, and rotation of the first input shaft may be transmitted to the crankshaft.

In the above embodiments, the first reduction gear unit is a type of reduction unit in which the external gear rotates with respect to the internal gear while revolving orbitally around the axis line of the internal gear. However, the first reduction gear unit may be a type of reduction unit in which the external gear revolves orbitally around the axis line of the internal gear, and the internal gear rotates around its own axis line. In this case, the carrier may be fixed to the support member and may restrict the rotation of the external gear, the internal gear may be capable of rotating with respect to the support member, and the output shaft may be fixed to the internal gear. This is also applicable to the second reduction gear unit.

The configuration of the reduction gear transmission shown in FIG. I may be expressed as follows. The reduction gear transmission comprises a first reduction gear unit and a second reduction gear unit.

The first reduction gear unit comprises a first input shaft for transmitting torque of a motor to the first reduction gear unit, a first external gear which is capable of rotating eccentrically with respect to the first input shaft, a first internal gear that meshes with the first external gear and that has a number of teeth differing from the number of teeth of the first external gear, and a first output shaft disposed coaxially with the first internal gear and that outputs the torque amplified by the first external gear and the first internal gear.

The second reduction gear unit comprises a second input shaft joined with the first output shaft and that transmits the output torque of the first reduction gear unit to the second reduction gear unit, a second external gear which is capable of rotating eccentrically with respect to the second input shaft, a second internal gear that meshes with the second external gear and has a number of teeth differing from the number of teeth of the second external gear, and a second output shaft disposed coaxially with the second internal gear, and that outputs the torque amplified by the second external gear and the second internal gear.

The second reduction gear unit further comprises a cylindrical member that extends along an axis line of the internal gear and passes through the second reduction gear unit. The second input shaft of the second reduction gear unit is positioned between an outer circumferential surface of the second reduction gear unit and an inner circumferential surface of the cylindrical member.

The first reduction gear unit is disposed between an extensional plane which continues from the outer circumferential surface of the second reduction gear unit and an extensional plane which continues from the inner circumferential surface of the cylindrical member.

The technical elements disclosed in the present specification or the drawings may be utilized separately or in all types of combinations, and are not limited to the combinations set forth in the claims at the time of filing of the application. Furthermore, the technology illustrated in the present specification or the drawings may simultaneously achieve a plurality of objects, and has technological utility by achieving one of those objects

The invention claimed is:

1. A reduction gear transmission comprising:
a first reduction gear unit having a first input shaft that rotates in accordance with a rotation of an output shaft of a motor, a first external gear that revolves orbitally around an axis line of the first input shaft in accordance with a rotation of the first input shaft, a first internal gear meshing with the first external gear and having a number of teeth differing from a number of teeth of the first external gear, and a first output shaft that rotates around an axis line of the first internal gear; and
a second reduction gear unit having a crankshaft that rotates in accordance with a rotation of the first output shaft, an eccentric cam that revolves orbitally around an axis line of the crankshaft in accordance with a rotation of the crankshaft, a second external gear engaging with the eccentric cam and having a through hole at a center of the second external gear, a cylindrical member passing through the through hole of the second external gear, a second internal gear meshing with the second external gear and having a number of teeth differing from a number of teeth of the second external gear, and a second output shaft rotating around an axis line of the second internal gear, wherein
the first reduction gear unit is positioned between an extensional plane that continues from an outer circumferential surface of the second reduction gear unit and an extensional plane that continues from an inner circumferential surface of the cylindrical member.

2. The reduction gear transmission according to claim 1, wherein
the first reduction gear unit has a first crankshaft that rotates in accordance with the rotation of the first input shaft and a first eccentric cam that revolves orbitally around an axis line of the first crankshaft in accordance with the rotation of the first crankshaft, and
the first external gear engages with the first eccentric cam.

3. The reduction gear transmission according to claim 2, wherein
the axis line of the first input shaft is offset from the axis line of the first crankshaft, and
the first crankshaft revolves orbitally around the axis line of the first input shaft in accordance with the rotation of the first input shaft.

4. The reduction gear transmission according to claim 1, further comprising an intermediate shaft that rotates around the axis line of the second internal gear in accordance with the rotation of the first output shaft, wherein
the crankshaft of the second reduction gear unit rotates in accordance with a rotation of the intermediate shaft.

5. The reduction gear transmission according to claim 4, wherein
the crankshaft of the second reduction gear unit revolves orbitally around the axis line of the second internal gear in accordance with the rotation of the intermediate shaft.

6. The reduction gear transmission according to claim 1, wherein
the crankshaft of the second reduction gear unit rotates around the axis line of the second internal gear in accordance with the rotation of the first output shaft, and
a through hole is formed in the crankshaft of the second reduction gear unit.

7. The reduction gear transmission according to claim 1, wherein
the first output shaft rotates in accordance with a rotation of the first external gear, and
the second output shaft rotates in accordance with a rotation of the second external gear.

8. A solar tracking photovoltaic power generation unit comprising:
a reduction gear transmission according to claim 1; and
a panel that is rotated by the reduction gear transmission.

9. The solar tracking photovoltaic power generation unit according to claim 8, wherein
the reduction gear transmission is disposed within a fixing part of the solar tracking photovoltaic power generation unit,
an axis line of the second output shaft is identical to an axis line of the fixing part, and
the panel is rotated around the axis line of the fixing part.

* * * * *